May 11, 1954     D. ARRAS ET AL     2,677,982
TOOL FOR SPREADING HOSE CLAMPS
Filed July 26, 1949

INVENTORS.
DAMIANO ARRAS.
DONALD H. BROWN.
BY Louis V. Lucia
ATTORNEY.

Patented May 11, 1954

2,677,982

UNITED STATES PATENT OFFICE 2,677,982

TOOL FOR SPREADING HOSE CLAMPS

Damiano Arras, New Britain, and Donald H. Brown, Plainville, Conn., assignors to The American Hardware Corporation, New Britain, Conn., a corporation of Connecticut Application July 26, 1949, Serial No. 106,786

3 Claims. (Cl. 81—9.3)

1

This invention relates to a tool for spreading hose clamps, particularly such hose clamps as shown in Patent No. 2,180,271 issued November 14, 1939.

Such hose clamps are produced for different sizes of hose and are constructed of wires of different diameters. It is, therefore, an object of this invention to provide a tool which may be used for conveniently and safely holding and spreading different sizes of the said hose clamps within the lmiits of the spreading tool regardless of the differences between the different sizes of the wires from which said clamps are constructed.

A further object of this invention is to provide such a tool whereby the clamp will be firmly held as it is removed from, or applied to a hose for clamping it in position.

A still further object is to provide said tool with means for holding the hose clamp so that it will extend from the tool in either a forwardly or a laterally direction for convenience in the application and removal of the clamp.

Further objects and advantages of this invention will be more clearly understood from the following description and the accompanying drawing in which.

Figure 1:
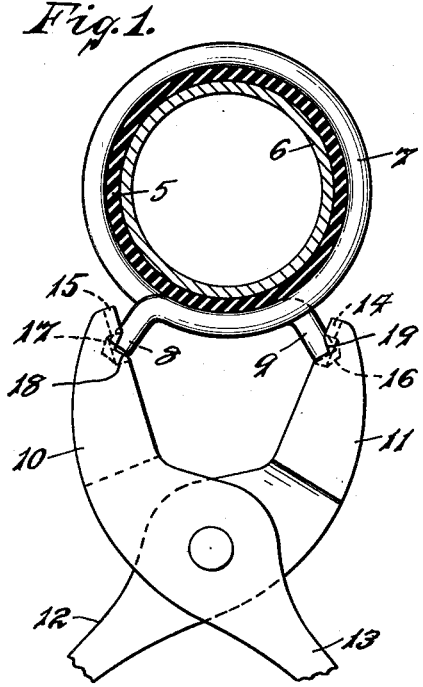
Fig. 1 is a front view showing my improved spreading tool at the beginning of a spreading operation on a hose clamp.

As illustrated in the drawings, the numeral 5 indicates a hose of common construction and such as usually made of rubber or other suitable flexible material, and the numeral 6 denotes a tubular member to which said hose is connected.

The hose clamps, for which my spreading tool is particularly intended, comprise a ring shaped body portion 7 having overlapping intermediate portions with projecting spaced apart ends 8 and 9.

Figure 2:
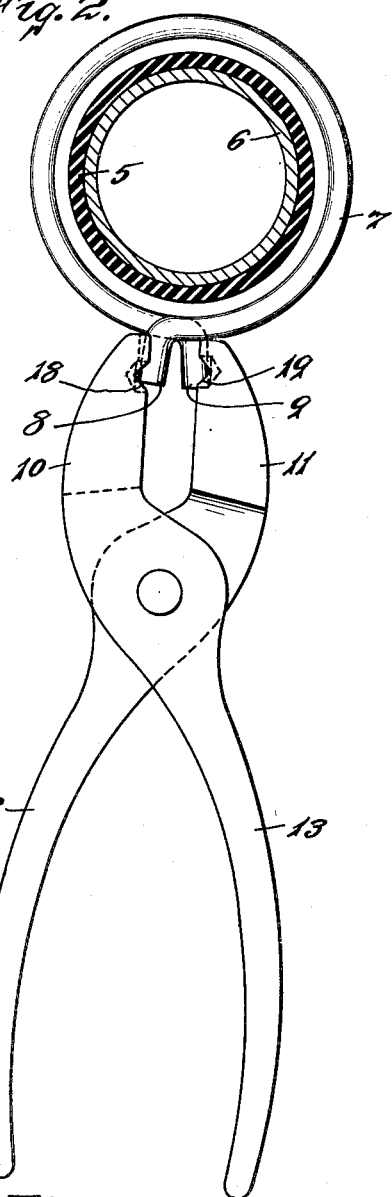
Fig. 2 is a similar view showing the position of the tool with the clamp in spread position.

Each hose clamp is tensioned so as to normally clamp the hose 5 to the member 6 and can be spread, to the condition illustrated in Fig. 2, so that it may be applied to, or detached from, the hose by forcing the ends 8 and 9 towards each other.

In order to safely and conveniently spread such hose clamps, my improved spreading tool is constructed in the form of a pair of pliers having pivotally connected jaws 10 and 11 with handles 12 and 13 extending therefrom.

Figure 3:
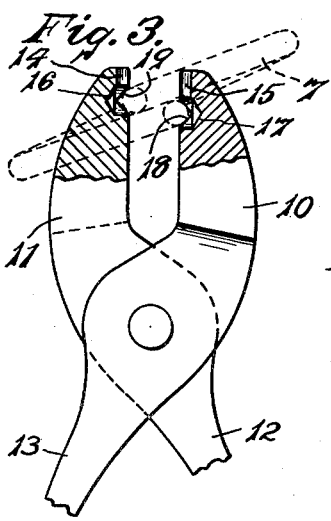
Fig. 3 is a side view showing the hose clamp extending laterally from the spreading tool.

The jaws 10 and 11 are provided, on the inner surfaces thereof, with longitudinally disposed V grooves 14 and 15, which extend, respectively, from the recesses 16 and 17 to the ends of the jaws for positioning the hose clamp longitudinally to the spreader tool as shown in Fig. 2. The said jaws are also provided with laterally disposed V grooves 18 and 19 which extend from the said recesses to the sides of the jaws for positioning the clamps laterally to the tool as shown in Fig. 3.

Figure 7:
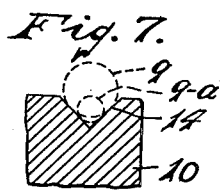
Fig. 7 is an enlarged fragmentary view showing the manner in which the said tool is adapted for use on clamps constructed of different sizes of wires.
Figure 5:
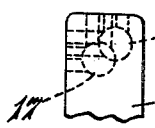
Fig. 5 is a fragmentary side view showing the end portions of the jaws of said tool.
Figure 6:
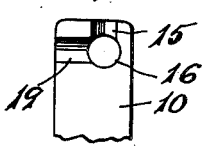
Fig. 6 is a fragmental inside view of one of the jaws.
Figure 4:
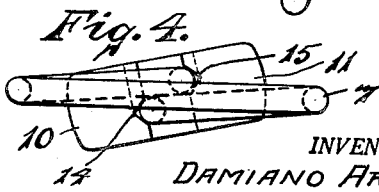
Fig. 4 is a plan view of the said tool and hose clamp as shown in Fig. 2.

The said grooves are cross-sectionally V-shaped in order to receive wires of different diameters, as indicated at 9 and 9-$a$ in Fig. 7, and permit hose clamps of different sizes of wires to become positioned so that the centers of the wires will always fall in the same plane, relatively to the pivot of the spreading tool, regardless of the size of the wire.

It will be noted that the grooves 14 and 15, and 18 and 19 are disposed on relatively spaced axes so that they will align with the overlapping portions of the hose clamp and thereby position said clamp in longitudinal or lateral alignment with the jaws of the spreader tool.

Since the said hose clamps are provided in different sizes and constructed from wires of different diameters, the V grooves of my improved spreader tool are made of an approximate size to accommodate wires of different sizes between desired limits. The relative spacing between the axes of the respective grooves in the opposite jaws is also made to accommodate the approximate distance between the axes of the projections 8 and 9 of the different sizes of hose clamps.

When it is desired to remove a hose clamp from the hose, the tool is applied to the clamp by engaging the projections 8 and 9 so that their ends will fit into the recesses 16 and 17, as illustrated in Fig. 1 of the drawings, and the sides of the said projections will then be in approximate alignment with the V grooves extending from said recesses. The tool is then closed, to the position illustrated in Fig. 2, and this will force the clamp into spread position whereby it may be readily removed from the hose or attached there- From the illustration, it will be noted that the ends 8 and 9 of the clamp will be engaged by the opposite surface of the V grooves in the opposite jaws and fulcrum at the sides of the recesses 16 and 17 so that, as the tool is closed, the said ends will move into the grooves and be thereby positioned against accidental displacement which could cause the hose clamp to snap out of the tool with possible danger to the user.

We claim:

1. A hose clamp spreading tool comprising a pair of opposed pivotally connected jaws, each having an inner surface with a groove therein extending to the free edge of said surface, the longitudinal centers of the grooves in the opposite jaws being located on spaced parallel planes perpendicular to the said inner surfaces.

2. A hose clamp spreading tool comprising a pair of opposed pivotally connected jaws, each having an inner surface with a groove therein extending to the free edge of said surface, the longitudinal centers of the grooves in the opposite jaws being located on spaced parallel planes perpendicular to the said inner surfaces and transverse to said jaws.

3. A hose clamp spreading tool comprising a pair of opposed pivotally connected jaws, each having an inner surface with a groove therein extending to the free edge of said surface, the longitudinal centers of the grooves in the opposite jaws being located on spaced parallel planes perpendicular to the said inner surfaces and longitudinal to said jaws.

References Cited in the file of this patent

UNITED STATES PATENTS

| Number | Name | Date |
| --- | --- | --- |
| 402,673 | Hudson | May 7, 1889 |
| 1,093,910 | Cain | Apr. 21, 1914 |
| 1,330,431 | De Graff | Feb. 10, 1920 |
| 1,478,942 | Cook | Dec. 25, 1923 |
| 1,501,816 | Seppmann | July 15, 1924 |
| 1,661,365 | Gendron | Mar. 6, 1928 |
| 1,699,005 | McLean | Jan. 15, 1929 |
| 1,958,638 | Olen | May 15, 1934 |
| 2,180,271 | Arras | Nov. 14, 1939 |
| 2,318,816 | Tinnerman | May 11, 1943 |

FOREIGN PATENTS

| Number | Country | Date |
| --- | --- | --- |
| 525,160 | France | May 28, 1921 |
| 360,713 | Great Britain | Nov. 12, 1931 |